United States Patent [19]
Jahnke et al.

[11] Patent Number: 5,429,573
[45] Date of Patent: Jul. 4, 1995

[54] DIE LIFT TOOL FOR ROTARY PUNCH MACHINE

[75] Inventors: John E. Jahnke, Green Bay; Paul D. Rauscher, De Pere, both of Wis.

[73] Assignee: Economy Machine & Tool Company, Green Bay, Wis.

[21] Appl. No.: 134,848

[22] Filed: Oct. 12, 1993

[51] Int. Cl.⁶ ............................................. B23Q 3/155
[52] U.S. Cl. ........................................ 483/1; 29/426.5; 83/670
[58] Field of Search ............... 483/28, 1; 83/690, 670; 279/103; 29/426.5, 426.1

[56] References Cited

U.S. PATENT DOCUMENTS

| | | | |
|---|---|---|---|
| 1,161,310 | 11/1915 | Hennessy | 483/28 X |
| 1,649,635 | 11/1927 | Willard | 83/670 X |
| 1,786,029 | 12/1930 | Phillips | 279/103 |
| 2,847,225 | 8/1958 | Kosinski | 83/670 X |
| 3,143,177 | 8/1964 | Carornean et al. | 279/103 X |
| 4,040,161 | 8/1977 | Kelch . | |
| 4,548,113 | 10/1985 | Topperwien | 83/670 X |
| 4,949,449 | 8/1990 | Wilson | 298/402.08 |
| 5,152,209 | 10/1992 | Berger . | |

*Primary Examiner*—William Briggs
*Attorney, Agent, or Firm*—Andrus, Sceales, Starke & Sawall

[57] ABSTRACT

A die lift tool removes worn or damaged dies from their bores in the female wheel of a rotary punch machine. The tool has a generally cylindrical camming portion with a segment removed to form a lowered surface. The tool is inserted into openings located below die bores with the lowered surface in contact with the bottom of a die. When the tool is rotated, the die is displaced outwardly from its bore by the camming portion for removal from the wheel.

1 Claim, 2 Drawing Sheets

DIE LIFT TOOL FOR ROTARY PUNCH MACHINE

BACKGROUND OF THE INVENTION

The present invention relates generally to rotary punch machines comprising punches and dies. More specifically, the invention relates to a tool for quickly and easily, removing worn or broken dies from the female wheel or ring of such a machine.

Rotary punch machines, of the type in which the present invention may be employed, are used to puncture paper to form, for example, tractor feed holes along the sides of a web of paper that is continuously fed to a computer printer. Such punch machines have a rotary, male wheel with a plurality of circumferentially spaced male punches and a complementary, rotary female wheel with a plurality of mating dies. The paper to be punched is fed between the rotary wheels.

Due to the high speed, high friction and other operating characteristics of rotary punch machines, the punches and dies break or wear out and need to be replaced. While the individual punches can be easily removed and replaced in the male wheel, the dies are seated in bores in the female wheel making their removal more difficult. The dies may become wedged in the bores due to the constant pounding exerted by the punches. Bits of paper, dust or other small particles may build up between the dies and the bore walls, also hindering removal. The dies are flush or only slightly elevated with respect to the female wheel making them difficult to grasp when they are to be extracted from the female wheel.

SUMMARY OF THE INVENTION

It is, therefore, the object of the present invention to provide a die lift tool by which dies may be quickly and easily removed from their bores in the female wheel of a rotary punch machine. The die lift tool is simple and inexpensive in construction and easy to operate.

To these ends, a rod-like die lift tool is provided having, preferably, a generally cylindrical configuration. In a portion of the periphery of the tool, the surface of the tool is lower than in other portions. For example, a flat surface may be provided on a portion of the periphery of the tool, as by the removal of a circumferential segment.

In use, the die lift tool is inserted into a hole located below one or more seated dies and into which hole the bottom of the die extends. The die lift tool is inserted with the lowered surface abutting the bottom of the die. When the tool is rotated in the hole, the cylindrical surface of the tool is brought into engagement with the bottom of the die. The differential in height between the lowered surface and the cylindrical surface unseats the die in the bore and allows the die to be removed. A handle may be provided on the tool to facilitate its rotation.

BRIEF DESCRIPTION OF THE DRAWING

The invention will be further understood by reference to the following detailed description and accompanying drawing.

In the drawing.

DETAILED DESCRIPTION OF THE PREFERRED EMBODIMENTS

Figure 1:
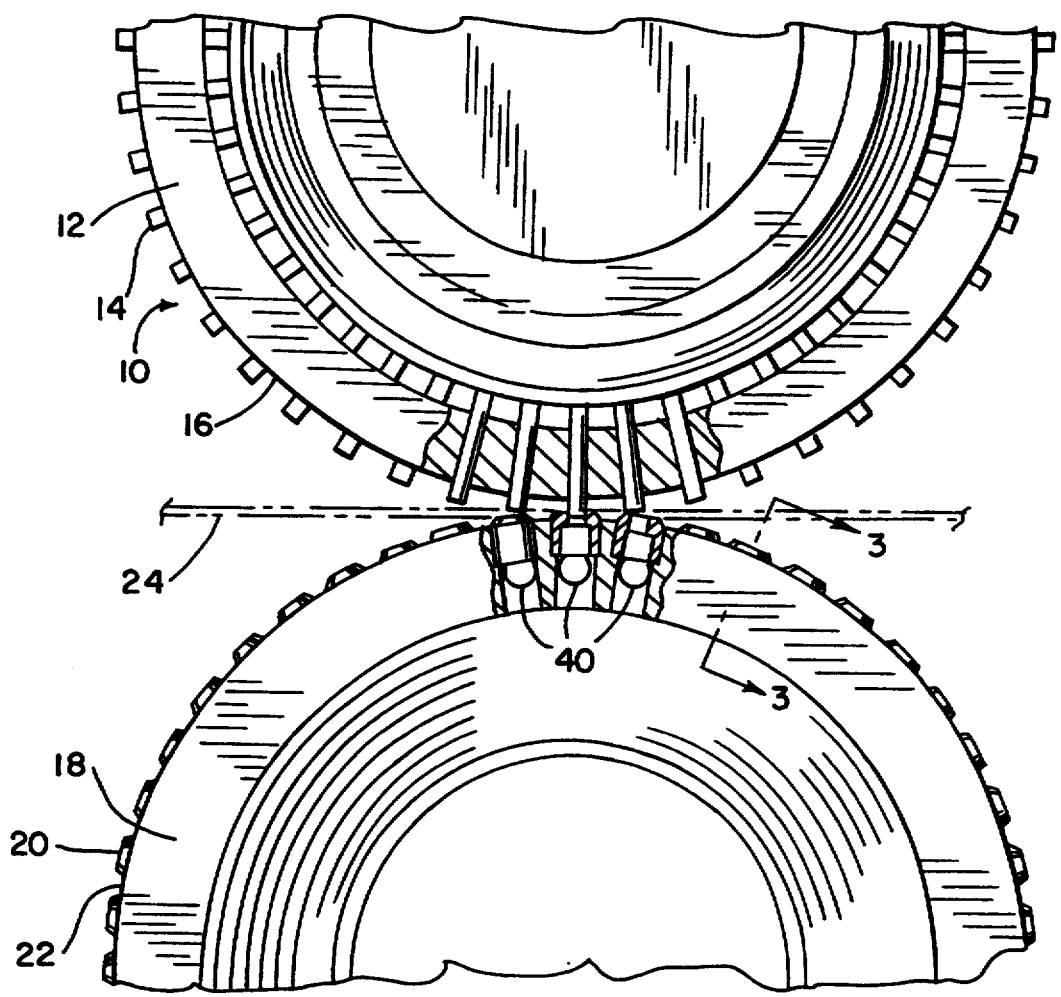
FIG. 1 is a partial side view showing a rotary punch machine in which the die lift tool of the present invention may be utilized.

As shown in FIG. 1 rotary punch machine 10 comprises rotating male wheel 12 carrying circumferentially spaced punches 14 extending from its circumference 16 at equal intervals and rotating female wheel 18 with dies 20 correspondingly spaced about its circumference 22. Male wheel 10 and female wheel 18 rotate synchronously so that dies 20 receive punches 14, puncturing a series of holes in a web of paper 24, cardboard or the like, fed between the punches and dies. When the web is to form tractor fed paper for a computer printer, a series of holes is provided along each side of the web.

Figure 3:
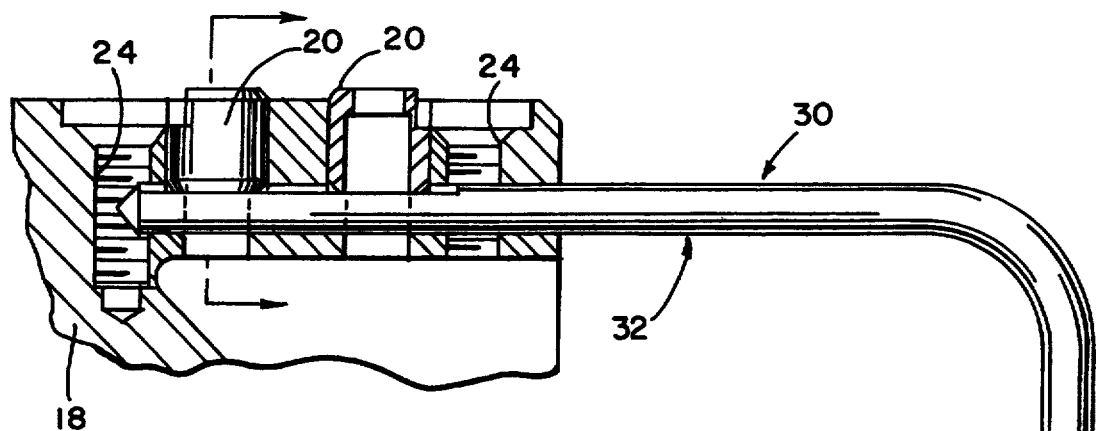
FIG. 3 is a cross-sectional view taken along the line 3—3 of FIG. 1 showing the dies of the rotary punch machine and the die lift tool.

As shown most clearly in FIG. 3, dies 20 are cylindrical in shape. The upper and lower circumferential edges of the dies may be beveled. A portion of the upper part of each of dies 20 is removed so that locking screws inserted in tapped holes 24 retain the dies in bores in female wheel 18. Dies 20 may be provided in pairs in female wheel 3. This permits two parallel series of holes to be punched in paper web 24. The web is then slit between the parallel series of holes to form two separate webs of tractor fed computer printer paper.

Figure 2:
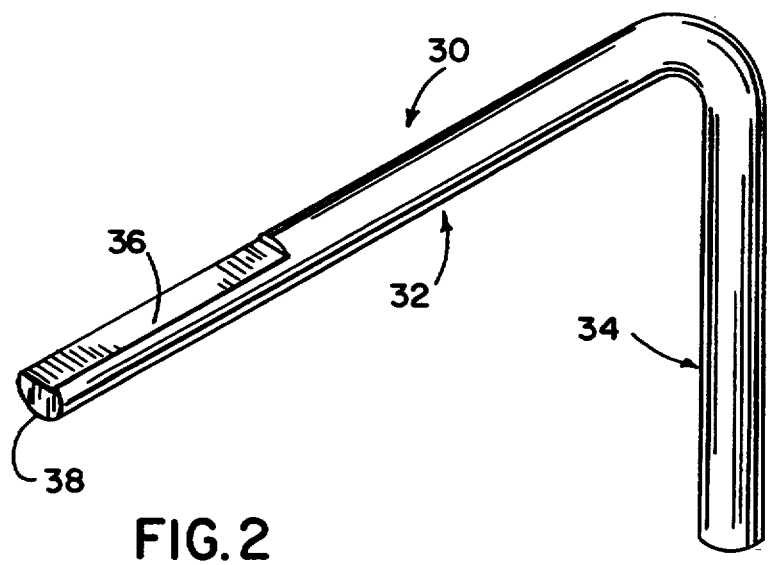
FIG. 2 is a perspective view showing one embodiment of the die lift tool of the present invention.

Die lift tool 30 shown in FIG. 2 is used to assist in the removal of dies 20 from the bores in female wheel 18. Die lift tool 30 is generally formed as a cylindrical rod having camming portion 32 and handle portion 34. Handle portion 34 may be bent at a 90 degree angle with respect to camming portion 32.

Figure 6:
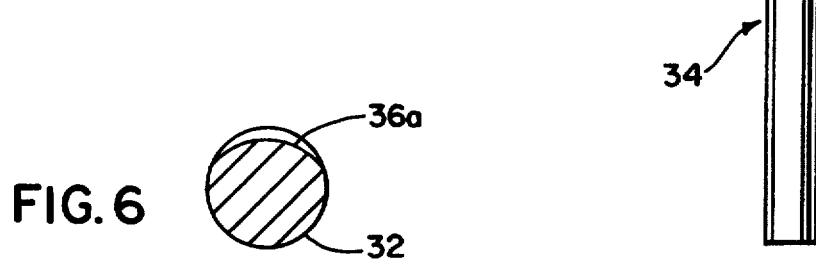
FIG. 6 is a cross-sectional view showing another embodiment of the die lift tool of the present invention.

Camming portion 32 contains a surface 36 along a part of is periphery that is lowered with respect to the cylindrical surface forming the remaining parts of the periphery of camming portion 32. A differential in height thus exists between lowered surface 36 and the remaining peripheral part. For example, surface 36 may be a flat surface which forms a chord of the generally circular cross-section of camming portion 32, as shown in FIG. 2. This surface may be formed by the removal of a circumferential segment from the rod forming die lift tool 30. Or, the lowered surface may be curved, as shown in FIG. 6 by surface 36a, or can be formed of arcuately arranged, incremental flat surfaces or some other configuration that will provide the desired height differential.

The distal end 38 of camming portion 32 is beveled. The proximal end of the camming portion is continuous with handle portion 34.

Die lift tool 30 of the present invention is used in the following manner. As shown in FIGS. 1 and 3, a hole 40 is located in female wheel 18 below the bores for each pair of dies 20. The bottoms of dies 20 extend into holes 40.

Figure 4:
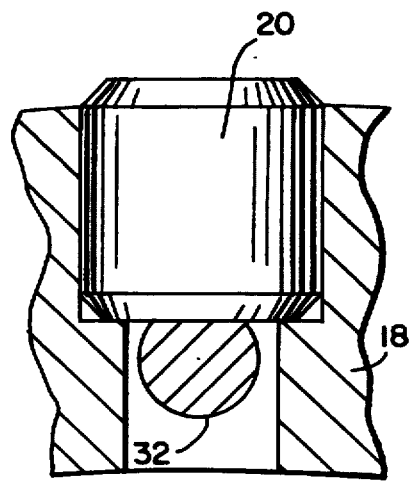
FIG. 4 is a cross-sectional view taken along the line 4—4 of FIG. 3 showing the die lift tool in one position.

To extract dies 20 from female wheel 18, the locking screws in holes 24 are removed. Die lift tool 30 is inserted in one of holes 40 so that lowered surface 36, 36a abuts the bottoms of the dies. See FIGS. 3 and 4. Surface 36, 36a is lowered to the extent necessary for the surface to clear the bottoms of the dies to allow insertion of camming portion 32 in holes 40. The beveled end 38 of camming portion 32 assists in this insertion.

Figure 5:
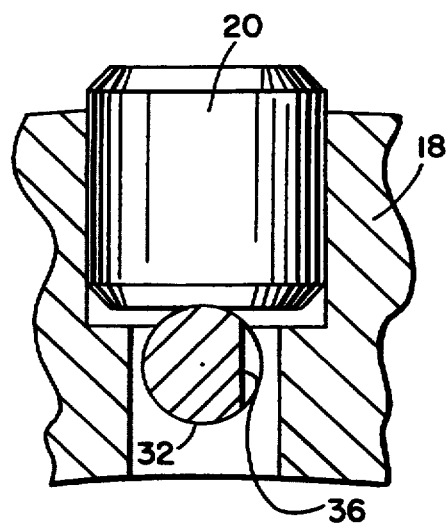
FIG. 5 is a cross-sectional view similar to that of FIG. 4 showing the lifting action of the die lift tool.

Camming portion 32 is then rotated in hole 40 by means of handle 34 to bring the cylindrical surface of camming portion 32 into contact with the bottoms of dies 20 to raise dies 20 in the bores of female wheel 18, as shown in FIG. 5. This loosens dies 20 in the bores, allowing them to fall out of the female wheel or to be grasped for removal. The height differential between lowered surface 36, 36a and the cylindrical surface of camming portion 32 is selected so that the dies are raised in the bores by the desired amount.

The die lift tool of the present invention thus provides a simple, economical, and effective means for removing dies from the female wheel of a rotary punch machine.

Various modes of carrying out the invention are contemplated as being within the scope of the following claims particularly pointing out and distinctly claiming the subject matter regarded as the invention.

I claim:

1. A method of removing a die from a right cylindrical bore along a radius of a female wheel of a rotary punch machine, said wheel having a hole by which the bore can be accessed and into which a bottom of the die extends, said method comprising the steps of:
    inserting an elongated tool into the hole in the female wheel, said tool having a generally cylindrical partial surface and a surface lowered with respect to the cylindrical partial surface;
    applying said lowered surface to the bottom of the die upon the insertion of the tool into the hole; and
    rotating the tool in the hole to bring the cylindrical partial surface into contact with the bottom of the die to dislodge the die in the hole and move the die outwardly in the right cylindrical bore along a radius of the rotary punch machine female wheel so that the die may be removed from the female wheel.

* * * * *